(12) United States Patent
See et al.

(10) Patent No.: US 8,086,721 B2
(45) Date of Patent: Dec. 27, 2011

(54) NETWORK RESOURCE MANAGEMENT IN A NETWORK DEVICE

(75) Inventors: Michael See, Chapel Hill, NC (US); Christopher Martin, Apex, NC (US)

(73) Assignee: Alcatel Lucent, Paris (FR)

( * ) Notice: Subject to any disclaimer, the term of this patent is extended or adjusted under 35 U.S.C. 154(b) by 1436 days.

(21) Appl. No.: 10/603,918

(22) Filed: Jun. 25, 2003

(65) Prior Publication Data

US 2004/0008727 A1     Jan. 15, 2004

Related U.S. Application Data

(60) Provisional application No. 60/392,115, filed on Jun. 27, 2002.

(51) Int. Cl.
*G06F 15/177* (2006.01)
(52) U.S. Cl. .................. 709/224; 709/228; 709/227
(58) Field of Classification Search .................. 709/223, 709/224, 227, 228
See application file for complete search history.

(56) References Cited

U.S. PATENT DOCUMENTS

| 5,828,830 | A * | 10/1998 | Rangaraian et al. ............ 714/48 |
| 6,408,277 | B1 * | 6/2002 | Nelken ........................ 705/7.15 |
| 2001/0029534 | A1 | 10/2001 | Spinks et al. |
| 2001/0032259 | A1 * | 10/2001 | Herrmann et al. ............ 709/224 |
| 2002/0059407 | A1 * | 5/2002 | Davies ......................... 709/223 |
| 2003/0055952 | A1 * | 3/2003 | Motoyama et al. .......... 709/224 |
| 2003/0086425 | A1 * | 5/2003 | Bearden et al. ............... 370/392 |
| 2004/0049552 | A1 * | 3/2004 | Motoyama et al. .......... 709/208 |

FOREIGN PATENT DOCUMENTS

GB     2 295 299 1     5/1996

OTHER PUBLICATIONS

"Esker Plus v2.0: LDAP Principle and Mechanism," Internet Citation, Jun. 1998, XP002222590, Retrieved from the Internet: < URL:http://www.its.esker.fr/Documents/980602004B.htm>, Retrieved on Nov. 27, 2002.

* cited by examiner

*Primary Examiner* — Kenneth R Coulter
(74) *Attorney, Agent, or Firm* — RG & Associates

(57) ABSTRACT

A method, apparatus, and system for managing network devices is disclosed. The method preferably includes the steps of monitoring for a change to the value of one or more local resource properties associated with the managed network device; generating a learning event report comprising the value of at least one of the one or more local resource properties; and transmitting the learning event report to a central data store. At the central data store, the value of the one or more local resource properties are recorded and made available to the network management system for asynchronous processing. The central data store is preferably a directory server. The apparatus preferably includes a local resource manager for monitoring the value of one or more local resource properties; detecting the changes to one or more local resource properties; generating one or more learning event reports including the changes to the local resource properties; and transmitting the one or more learning event reports to the central data store. The invention reduces the burden on the network management system to regularly poll the numerous devices under management while improving accuracy.

25 Claims, 5 Drawing Sheets

NETWORK RESOURCE MANAGEMENT IN A NETWORK DEVICE

CROSS REFERENCE TO RELATED APPLICATION

This application claims priority from the following U.S. Provisional Patent Application, the disclosure of which, including all appendices and all attached documents, is hereby incorporated herein by reference in its entirety for all purposes: U.S. Provisional Patent Application Ser. No. 60/392,115, to Michael See and Christopher Martin, entitled, "NETWORK RESOURCE MANAGEMENT IN A NETWORK DEVICE," filed Jun. 27, 2002.

FIELD OF THE INVENTION

This invention relates generally to a network including a network management system and one or more network devices under its management. In particular, the invention relates to a method, apparatus, and system for unilaterally reporting the value of local resource properties by the managed network devices to a central data store with minimal network management system polling of the managed network devices.

BACKGROUND OF THE INVENTION

In a distributed network, there are typically a plurality of network devices and one or more devices that collect information on those devices for network management purposes. Current technology typically uses the Simple Network Management Protocol (SNMP) for tracking changes to the various network resources associated with the network devices. The SNMP architecture is described in detail in Internet Engineering Task Force Request for Comment 2571 entitled "An Architecture for Describing SNMP Management Frameworks," April 1999 (hereinafter referred to as RFC 2571), which is incorporated herein by reference.

Referring to FIG. 1, the SNMP messages are generally exchanged between a central network management system (CNMS) 102 and a plurality of network devices or agents, including managed network devices (MND) 104-105. The CNMS 102 acquires information about the managed devices by contacting each MND 104-105 separately and retrieving the necessary information using a plurality of SNMP Get and GetNext operations, for example. The information requested generally relates to the status, configuration, and performance of managed network devices and is described in the form of a managed information base (MIB). The one or more values returned from the MND 104-105 are often stored in the local database 110 where it is available when needed by network management applications that manage assets or track medium access control (MAC) addresses in the network, for example.

In order for the information stored in the local database 110 to be useful in managing the network 106, it must be readily available, accurate, and updated in a timely fashion so that the information remains current. In this regard, the CNMS 102 regularly polls the MNDs 104-105, retrieves the necessary information, and updates the data or database 110 for the CNMS applications. In response to polling, the CNMS 102 generally receives all information from a MND, not just the information that has changed since the last time information was received.

Under limited circumstances, the CNMS 102 will also receive SNMP traps, i.e. notifications, from a MND when the network 106 or a MND experiences certain problems or a specified event has occurred. If network system resources are unavailable or a network link is down, for example, an SNMP Trap is transmitted from the network device to the CNMS 102. In response to a SNMP TRAP message, the CNMS 102 generates a request for the appropriate information to assess the problem, waits to receive a response from the MND, and then updates its database.

The accuracy of the database 110 is therefore dependent upon the frequency at which the CNMS 102 polls the MNDs 104-105, and on the speed with which the NMS can process SNMP Traps. Unfortunately, the ability of the CNMS 102 to maintain an accurate database 110 is hampered by the heavy workload placed on the CNMS 102 by the need to poll and respond to Traps. In an enterprise network that has hundreds of MNDs, for example, this workload could overwhelm the CNMS 102 and substantially impair its availability. Frequent polling also places a burden on the network device to process the information requests and respond with the requested information.

The inaccuracy of the information retained at the CNMS 102 may also be exasperated by the inherent unreliability of SNMP or other management protocols that rely on user datagram protocol (UDP). Since packets transmitted using UDP are not guaranteed, a CNMS 102 may be required to poll a MND multiple times before receiving the accurate information.

Accordingly, in order to maintain readily available, accurate and updated network resource information, there is a need for new type of a resource manager.

SUMMARY

The invention in the preferred embodiment features a method of managing a managed network device (MND) comprising the steps of monitoring the value of one or more local resource properties (LRPs) associated with the managed network device; generating a learning event report comprising the value of at least one of the one or more local resource properties; and transmitting the learning event report to a central data store. The central data store is preferably a directory server adapted to exchanging one or more Lightweight Directory Access Protocol (LDAP) messages with one or more managed network devices. At the central data store, the value of the one or more LRPs are recorded and made available to the network management system for asynchronous processing.

The one or more LRPs generally comprise internal resource properties and connectivity properties. The internal resource properties associated with the particular managed network device preferably include: MND hardware configurations including network modules installed; MND software installations including the types of software and software version levels and the respective date when such information was last updated; and MND identity information including device name, serial number of the chassis or primary management processor, location information, type of device, list of network interface module (NIM) names, NIM slot number, NIM part number, NIM hardware revision level, NIM serial number, and NIM date of manufacture. The connectivity properties preferably include: the OSI network model layer 2 and layer 3 addresses of edge devices, network interface module names, network interface module types, connection speeds, network interface module slot numbers, network interface module port numbers, the network protocols being used by the edge devices or systems, and the administrative and operational state of the link with the edge devices.

The step of monitoring preferably comprises the steps of detecting one or more learning events, and periodically polling for a current value of the one or more local resource properties. The detection may occur through one or more learning mechanisms designed into the device, including interrupt signals that are automatically generated upon installation of a NIM, for example. Periodically polling for a value of a LRP value preferably occurs continually at a regular interval referred to herein as the polling interval, generally between 30 seconds and 5 minutes in duration depending on the LRP.

The learning event report preferably consists essentially of the value of the one or more LRPs that changed since the preceding learning event report was generated. Such learning reports are generally transmitted to the central data store at the conclusion of a polling interval when the current values of the LRPs are determined anew, although higher priority learning events may be reported as the change is detected.

In some embodiments, the managed network device, which is operatively connected to a network comprising a network management system and a central data store, comprises a local resource manager for monitoring the value of one or more LRPs, detecting the changes to one or more LRPs, generating one or more learning event reports including changes to the LRPs, and transmitting the one or more learning event reports to the central data store. The value of the one or more LRPs are recorded at the central data store and made available to the network management system for asynchronous processing. In the preferred embodiment, the managed network device is a switching device further including a plurality of network interface modules, a packet processor for performing packet parsing and ingress packet processing necessary to perform switching and routing; and one or more memory devices for retaining one or more rules sets for switching and routing. The managed network devices are generally network nodes or other addressable entities embodied in a processor, computer, or other appliance.

The invention in some embodiments is a network system comprising at least one central data store, a plurality of managed network devices adapted to monitor the value of one or more LRPs and transmit the value of the one or more LRPs to at least one central data store, and at least one network management system adapted to retrieve the value of the one or more LRPs from at least one central data store.

One skilled in the art will recognize numerous advantages to placing the "intelligence" and responsibility of maintaining the resource data at the network device, including:
(a) obviating the need for the NMS to poll managed network devices to determine state and collect the LRP values, thereby significantly reducing the bottleneck in large networks; (b) assuring that LRP values are relatively current because the MNDs update the central repository directly whenever there is a change in the resource data being monitored; (c) distributing the processing needed to detect and maintain the LRPs throughout the network, thereby avoiding the centralized management configuration present in prior art MNDs; and (d) reducing the volume of data sent across the network by only sending the data that has changed or is new.

BRIEF DESCRIPTION OF THE DRAWINGS

The present invention is illustrated by way of example and not limitation in the figures of the accompanying drawings, and in which.

DETAILED DESCRIPTION

Figure 1:
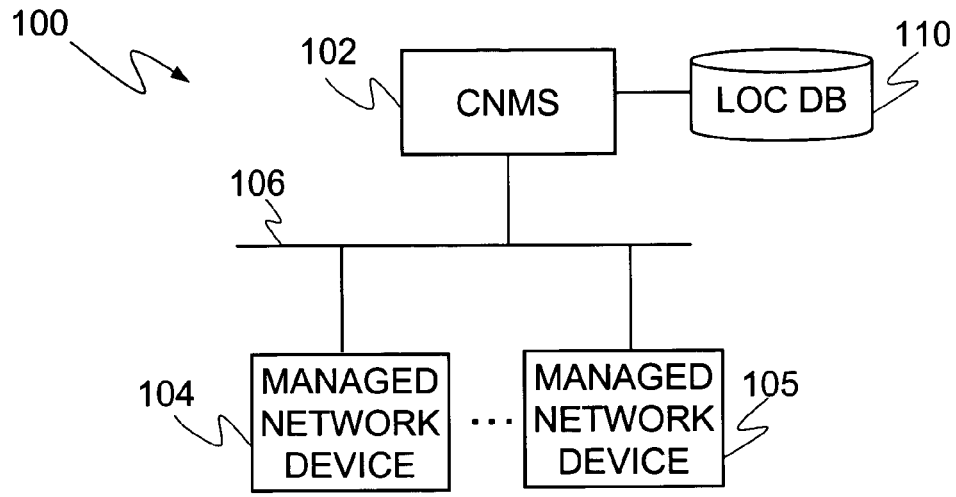
FIG. 1 is a pull-based central network management system for managing a network according to the prior art.
Figure 2:
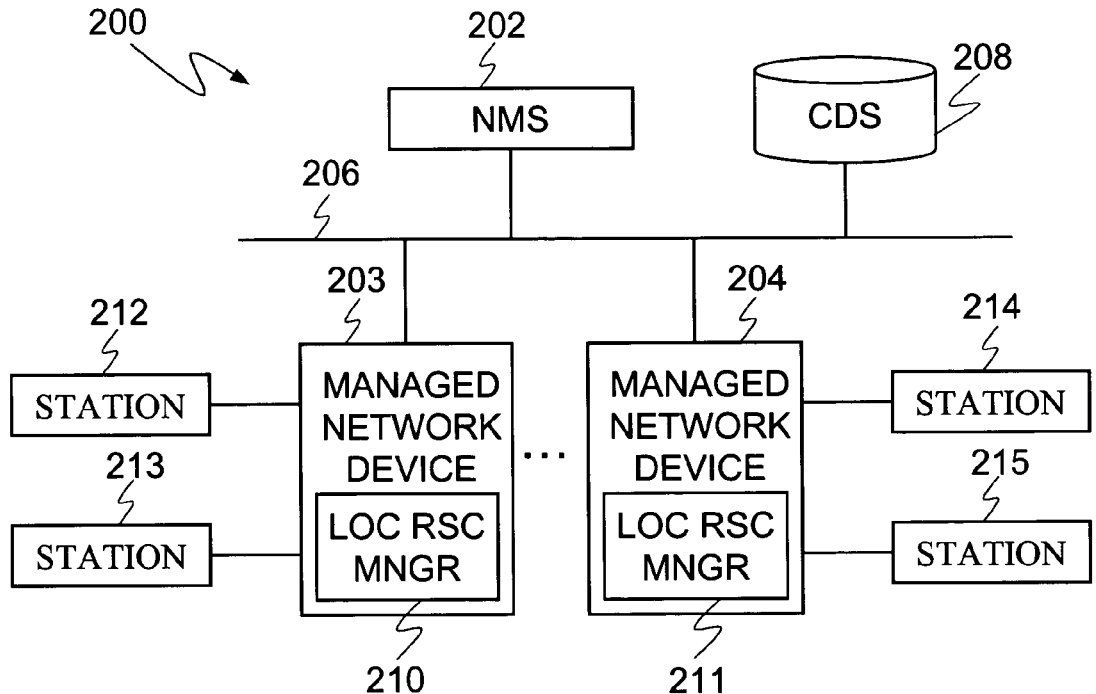
FIG. 2 is a network topology, including a network management system and managed network devices, with which the preferred embodiment of the present invention may be implemented.

Illustrated in FIG. 2 is a network topology with which the preferred embodiment of the asynchronous network resource management system may be implemented. The asynchronous network resource management (ANRM) system 200 is comprised of one or more network management systems (NMS) 202, one or more managed network devices 203, 204, and a central data store (CDS) 208 operatively coupled by means of a network 206. The network 206 may be the Internet, an Intranet, a local area network (LAN), a wide area network (WAN), or a metropolitan area network (MAN), for example. The NMS 202 may be a physical node in the network 206 or an application running on a workstation or server, for example.

The MND 203 and MND 204 may be any of a large number of network devices that are generally under the management of the NMS 202. A network device is preferably a network node or other addressable entity embodied in a processor, computer, or other appliance including, but not limited to, a network gateway device such as a switch, router, switch router, bridge, hub, for example. In the preferred embodiment, the MND 203 and MND 204 are switching devices capable of layer 2 and/or layer 3 switching operations as defined in the OSI network model. Operatively coupled to each of the MNDs 203, 204 are a plurality of edge devices or stations 212, 213, 214, 215, respectively.

The NMS 202 requires information about the various managed network devices 203, 204 under its management in order to operate optimally. Instead of acquiring this information using a series of message exchanges initiated by the NMS 202, the MNDs 203, 204 preferably report this information automatically and unilaterally to the central data store 208 so as to make this information available to the NMS 202 when needed. A request for information and the supply of the same information therefore occur substantially independent of one another in what can be termed as an asynchronous message exchange. When implemented with an independent storage device, the preferred embodiment relieves the NMS 202 of the burden of polling the plurality of network devices under its management, while immunizing the NMS 202 from disruptions in the availability of those network devices.

The information management responsibility is transferred, in the preferred embodiment, from the NMS 202 to the local resource managers (LRM) present in each of the one or more MNDs 203, 204. The purpose of each LRM 210, 211 is generally to monitor device-specific system attributes referred to herein as local resource properties (LRPs) at the MND, and report changes in this information directly to the CDS 208. The set of local resource properties preferably includes one or more internal resource properties and one or more connectivity properties. Reports of the internal resource properties and connectivity properties are uploaded by each of the MNDs 203, 204 and written to the CDS 208 where they are made available to the NMS for downloading or consultation. Each LRM 210, 211 can be embodied in software, hardware, firmware, or combination thereof.

The set of one or more internal resource properties monitored by a network device preferably includes, but is not limited to, one or more of the following categories: MND hardware configurations including network modules installed; MND software installations including the types of software and software version levels and the respective dates when such information was last updated; and MND identity information including device name, serial number of the chassis or primary management processor, location information, type of device, list of NIM name, NIM slot number, NIM part number, NIM hardware revision level, NIM serial number, NIM date of manufacture.

The set of one or more connectivity properties includes, but is not limited to, one or more of the following categories: the OSI network model layer 2 and layer 3 network addresses of edge devices or systems attached thereto, the port identifiers where these devices are attached to the MND, the speed of the ports where the edge devices are attached, the network protocols being used by the edge devices or systems, the administrative and operational state of the link between the edge device and the MND.

The CDS 208 in the preferred embodiment is a server, preferably a directory server such as an LDAP compliant directory server. In the preferred embodiment, the NMS 202 and LRM 210, 211 of each MND communicate with the central data store 208 using the LDAP protocol well understood by those skilled in the art. Because the LDAP protocol is a Transmission Control Protocol (TCP) based protocol, the write messages sent to the CDS 208 to upload and update LRPs, as well as the read messages by the NMS 202 for purposes of downloading the LRPs, are guaranteed to be transmitted successfully. Packets lost in an LDAP exchange with the CDS 202, for example, are generally retransmitted, unlike the user datagram protocol (UDP) used in prior art network management systems. It should be appreciated, however, that other data storage access technologies other than LDAP may also be implemented without straying from beyond the scope of the invention in its several embodiments.

Figure 3:
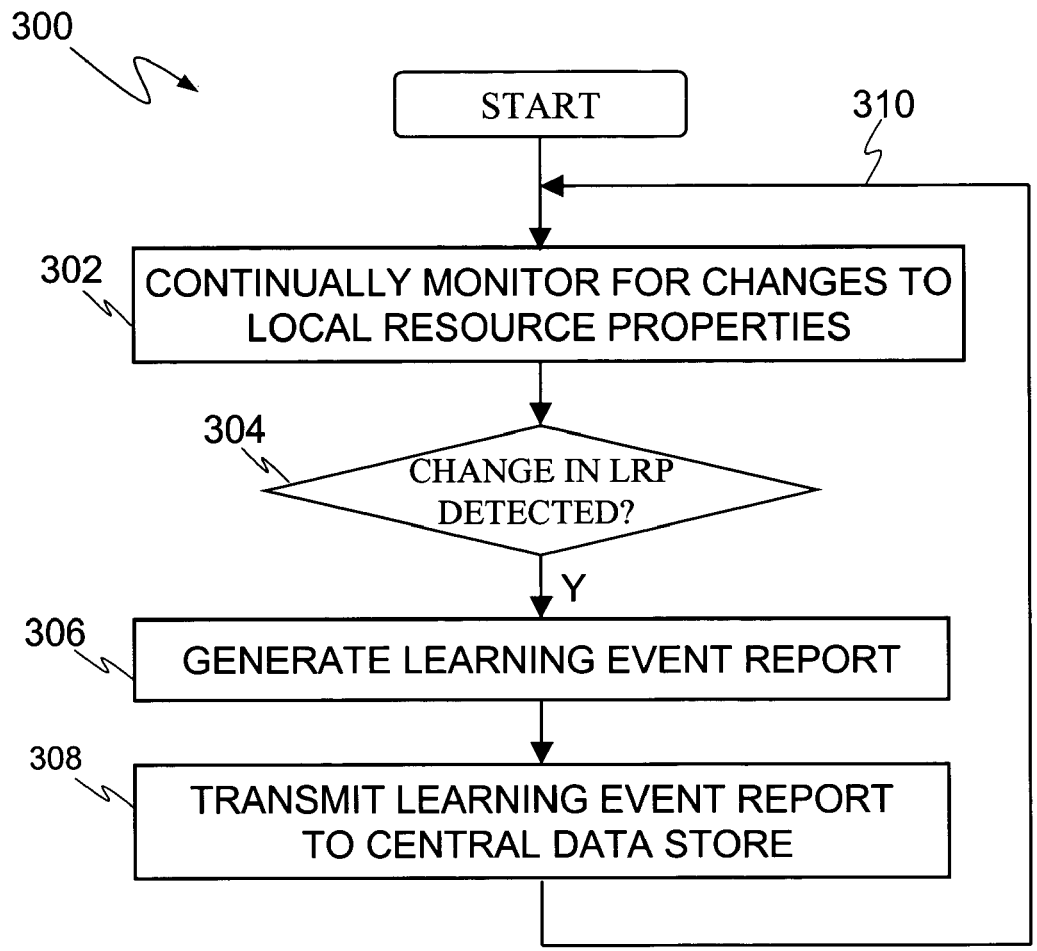
FIG. 3 is a flow chart of the method for managing local resource properties in a managed network device, according to the preferred embodiment of the present invention.

Illustrated in FIG. 3 is a flow chart of the method for managing local resource properties in a managed network device. In general, an MND in operational mode continually monitors for changes to one or more local resource properties, as illustrated in the monitoring step 302. In practice, monitoring may entail processing for actively detecting the status of a given property at a periodic interval, for example, or passive listening for one or more signals or interrupts, for example, that are automatically generated when a LRP changes or is changed. In either situation, a change in one or more states, values, or qualities associated with each of the one or more local resource properties gives rise to an occurrence referred to herein as a learning event.

When a learning event is detected at the MND, the change detection test 304 is answered in the affirmative. In the event report generating step 306, the MND generates a learning event report that comprises a listing of one or more local resource properties and the associated state, value, or quality. The frequency with which new learning event reports are generated depends on the nature of the one or more learning events and the MND configuration defined by the network administrator. For example, a learning event report destined for an LDAP server would be markedly different than a learning event report intended for a file server.

As illustrated in the transmitting step 308, the learning even report is transmitted to one or more central data stores collectively used as a repository for the LRPs of one or more MNDs. The learning even report is preferably transmitted automatically without necessarily being initiated at or prompted by the NMS 202 associated with the LRPs. Upon receipt of a learning event report, the LRPs are written to or otherwise recorded at the central data store where the report is made available at to the NMS and any authorized network administration personnel, for example. The NMS may therefore retrieve the state, value, or quality of any of the one or more LRPs of the one or more MNDs as needed. Since the upload of the LRPs by the one or more MNDs is independent of the retrieval by the NMS, the management system of the present invention may be termed an asynchronous management system.

In general, the decoupling of LRP data collection from the higher layer network management applications provides for a more accurate and efficient management process. For example, detecting duplicate learned MAC addresses in a network of several MNDs as embodied in this invention can be accomplished by a management application without explicit communication with an MND because the repository effectively contains the information known by the MND. An NMS application in some embodiments may, after detecting such a duplicate MAC condition on two different devices, verify that indeed the devices are simultaneously active. The application may in some embodiments employ traditional management methods, such as SNMP polls sent to only those selective devices that contained the (duplicate) MAC addresses.

The method comprising the monitoring step 302 through the transmitting step 308 is preferably an ongoing process that is continually repeated while the MND is in operation, as indicated by return path 310.

Figure 4:
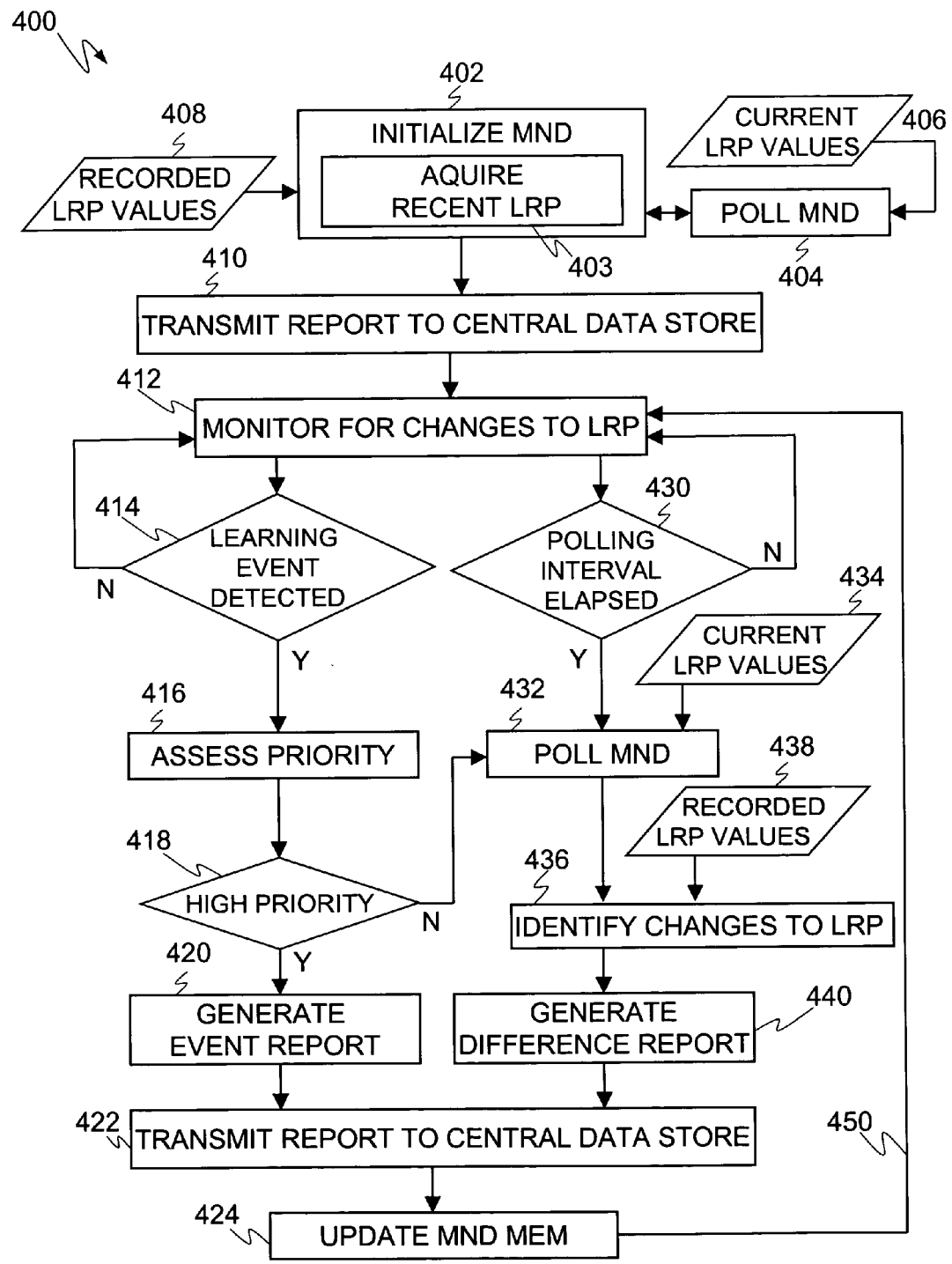
FIG. 4 is a flow chart of the method for managing local resource properties in a switching device, according to the preferred embodiment of the present invention.

Illustrated in FIG. 4 is a flow chart of the method for managing local resource properties in a switching device. In general, the MND 203, preferably a switching device, maintains a current and up-to-date record of its associated LRPs at the central data store 208. From the onset, the switching device 203 preferably transmits a learning event report contemporaneously with the initialization or start-up of the switching device 203. In the initializing step 402, which generally includes start-ups and boot-ups as well, the switching device 203 collects or otherwise acquires current LRPs associated with the switching device. The current LRPs preferably includes the most recent LRPs, but generally excludes, for example, stale data that has timed-out.

The state, value, or quality of each of the LRPs is generally determined in acquiring step 403 by means of one of two procedures depending on the property and the switching device configuration. First, the switching device 203 may determine the current LRPs values 406 by polling 404 the switching device or local resource directly. Second, the MND 203 may retrieve the last recorded value 408 of the one or more LRPs retained in local memory. In the preferred embodiment, the module responsible for retrieving, monitoring, and transmitting the status of the LRPs is the LRM 210.

The LRPs values retrieved in the initializing step 402 are transmitted 410 to the central data store 208, preferably in the form of a learning event report, where the one or more LRPs are recorded. In the preferred embodiment, only those LRPs values that have changed since the last learning event report are transmitted to the central data store, thereby reducing the collective network overhead required.

With the initialization of the switching device and upload of the LRPs values completed, the switching device transitions into an operational mode in which it is continually monitoring 412 for changes to the LRPs that give rise to a learning event. The LRM 210 is generally made aware of the value or the change in value of LRPs when changes are detected or the LRPs polled. A learning event may be detected in the detecting test 414 in any number of ways. For example, contemporary switching devices are designed to generate a kind of interrupt signal when a new network card is installed. One or more learning events may also be detected at periodic intervals referred to herein as the polling interval, which is preferably between 30 seconds and 5 minutes in duration. Upon elapse of the polling interval in the polling test 430, the local resource manager 210 queries the one or more local resources for purposes of determining the state, value, or quality of the LRPs.

In the preferred embodiment, upon receipt of an interrupt signal or other expression of a change in a LRP, the LRM 210 preferably assesses the priority level of the learning event. Higher priority events are affirmed in the prioritizing test 418 used to generate a learning event report 420 that is immediately transmitted 422 to the CDS 208 where learning event report is recorded in the updating step 424. A lesser priority learning event is generally treated comparably to a current LDP value 434 and incorporated in to the periodic learning event report in the reporting step 420. Inclusion of a new switching module or removal of an existing switching module, for example, generally constitute high priority learning events and are, therefore, immediately communicated to the central data store 208. New devices being connected to the network or a device being removed from the network is a lower priority event. This information can be communicated to the central data store every 15 or 30 seconds, for example.

The learning event report including the lesser priority events may be uploaded to the central data store 208, as illustrated in the transmitting step 422, when system resources can be made available or as part of learning event report compiled each polling interval.

In the preferred embodiment, the LRM 210 polls 432 the resources of the MND 203 for the status of the various LRPs at the elapse of the polling interval or other trigger event. Other trigger events in some embodiments may include normal learning and aging processes that are typical in network devices. For example, when an end system ages out of the end system tables maintained by the switching device 203, the information linking the end system to the specific slot and port of the switching device 203 is removed from the associated LRPs.

The current LRP values 434 retrieved via polling are preferably compared to the previously recorded LRP values 438 reported with the preceding learning event report. Any LRP values that have changed since the preceding report are determined in identifying step 436 and compiled into a new periodic learning event report in difference reporting step 420. The learning event report is then uploaded to the central data store, as illustrated in the transmitting step 422, where they are recorded 424 and made available to the NMS 202. The process by which learning events are detected and reported is continually repeated in the operational mode (or until administratively terminated), as indicated by return path 450.

Figure 5:
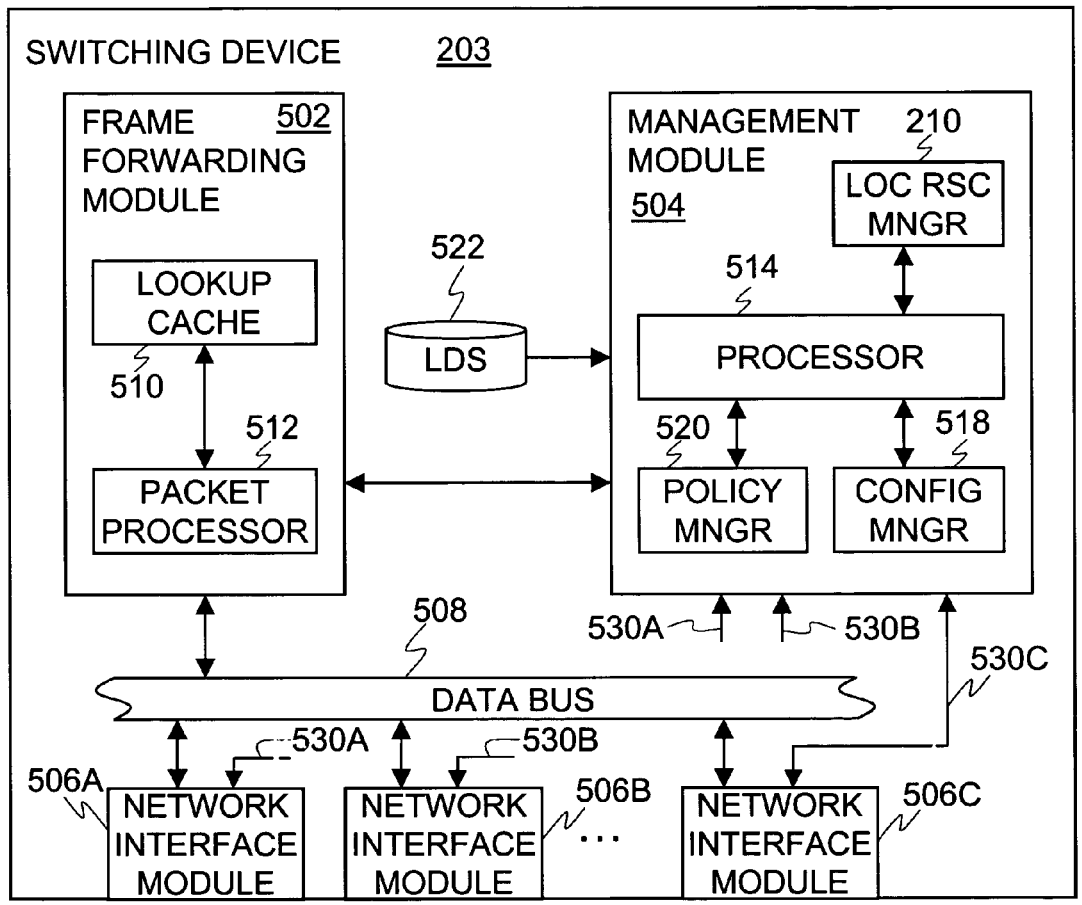
FIG. 5 is a functional block diagram of a switching device for performing asynchronous resource management, according to the preferred embodiment of the present invention.

Illustrated in FIG. 5 is a functional block diagram of a switching device for performing asynchronous resource management. The switching device 203 comprises one or more frame forwarding modules 502, a management module 504, and a plurality of network interface modules (NIMs) 506A, 506B, 506C. The frame forwarding module 502 generally comprises a packet processor 512 and lookup cache 510. The packet processor 512 performs substantially all the packet parsing and ingress packet encapsulation necessary to perform OSI model layer 2 switching or layer 3 routing. The lookup cache 510 preferably includes one or more memory devices used to retain one or more tables or one or more rules sets necessary to switch a packet to the appropriate port or route the packet in accordance with a networking protocol such as TCP/IP. Source and destination addresses retained in lookup cache 510 are determined by the control protocols of the networking layers, or the addresses can be statically defined. The rules sets used to process incoming traffic more generally, are defined by the policy manager 520 or by the network administrator via a configuration manager 518.

The management module 504 preferably comprises one or more processors 514 that interface with the configuration manager 518, policy manager 520, and local resource manager 210.

The configuration manager 518 preferably provides the interface through which the network administrator views, inputs, and/or modifies configuration settings. The policy manager 520 provides the rule sets used to process incoming traffic, which are uploaded to the look-up cache 510. The primary function of the LRM 210 in this embodiment is to monitor the one or more LRP values, generate the learning event reports, and provide the learning event reports to the central data store 208.

The switching device 203 further comprises a plurality of NIMs 506A, 506B, 506C that are divided among a plurality of detachable slots retained in a switching device chassis. The chassis generally includes a switching fabric for operatively coupling the plurality of NIMs across the slots. The plurality of NIMs 506A, 506B, 506C are operatively coupled to the frame forwarding module 502 by means of one or more data buses 508.

The switch is preferably identified by a switch name, chassis serial number, primary management processor, and type of switch; the slots are identified by a slot type or slot name; and the NIMS 503A, 506B, 503B are identified by part number, hardware revision level, serial number, and date of manufacture, which are preferably communicated to the management module 504 via the signaling channels 530A, 506B, 530C. The switch properties, slot properties, and NIM properties are all subject to monitoring and reporting by the LRM 210, as well the date and time indicating when the properties were last updated.

In some embodiments, the LRM 210 is adapted to monitor and report on switch location information including adjacency information. Connectivity properties including information about the end systems attached to a MND may also be stored in the CDS 208 using the same basic mechanism described herein. For example, when the switching device 203 learns of a new end system attached to one of its ports, it preferably acquires the following information: the end system MAC address and IP address; the slot/port/switch to which the end system is attached; and the virtual LAN membership associated with the end system. One or more of these connectivity properties may be provided to the CDS 208 at the time the MND 203 is started, and subsequently updated in the course of continual operation.

The LRM 210 may retain a record of one or more LRPs in the local device store (LDS) 522. Records of the prior LRP values may be used in the standard operational mode as a reference for purposes of detecting changes in LRP values. The CDS 208 may also retain a comprehensive record of LRP values for archival purposes. Information about the end systems that have been connected to the MND, for example, may be of importance to some security applications designed to limit or otherwise restrict which end systems connect to the network 206.

Figure 6:
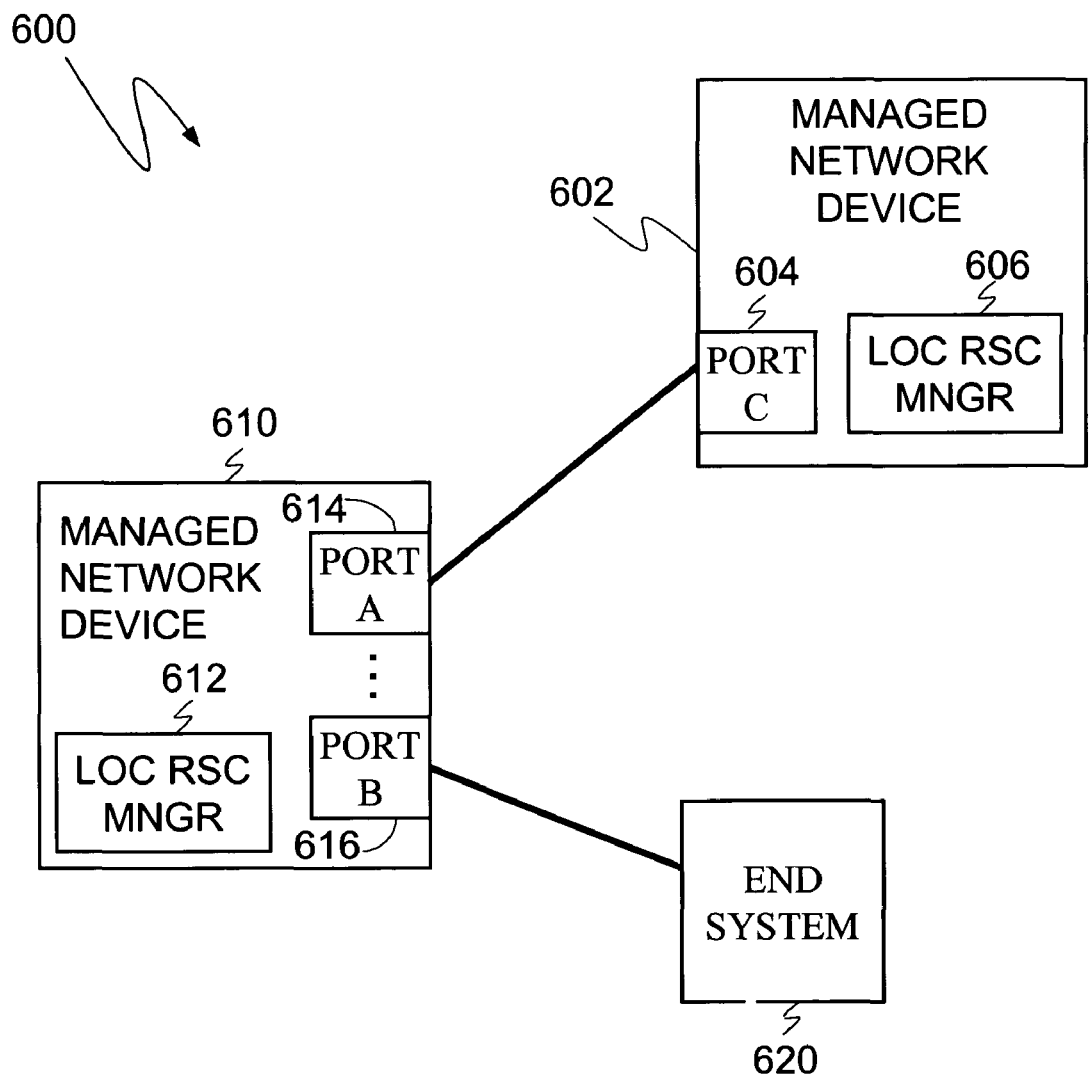
FIG. 6 is a subnetwork illustrating a managed network device adapted to resolve adjacency information, according to the preferred embodiment of the present invention.

In the subnetwork 600 of FIG. 6, the LRM of a MND is adapted in some embodiments to perform additional processing necessary to resolve the topology of the network 206 in proximity to the MND. In so doing, the MND device may distinguish between devices that are directly connected to it verses those that are indirectly connected. The direct adjacency information consisting of a list of one or more devices directly connected to a MND is preferably stored at either the device itself or at the CDS 208.

The need for such resolution arises in a layer 2 switched, i.e. bridged, environment where the frames from an end system are forwarded through one or more network devices without any modification to the packet. The identity of the end system is then extracted from the frame at a plurality of network devices in the propagation path. Since the packets are unmodified, the plurality of network devices are unable to distinguish the remote source of the packets, and learn the end system address as though each were directly connected to the end system. It is therefore desirable in most cases to record only the switch/port where the end system is directly connected.

In the present embodiment, a first local resource manager, first LRM 612, of a first MND 610 is adapted to detect all adjacent end systems, including the first end system 620, by means of an adjacency detection message exchange. Adjacency detection message exchanges, which are well known to those skilled in the art, are generally and typically limited to a single hop. That is, the first MND 610 is generally able to detect the presence of the end system 620 while the second MND 602 is generally not.

For example, the MND 610 will detect the slot/port B 616 values for both the end system 620 as well as an ingress frame from the end system 620, thereby confirming the adjacency of the this device. In the preferred embodiment, the LRM 612 updates the associated CDS (not shown) with this connectivity information. In contrast, the MND 602 will detect the inconsistency between the slot/port A 614, learned adjacency detection, and slot/port B 616, learned from the a frame originating from the end system 620. With the absence of adjacency confirmed, the LRM 606 of the MND 602 preferably withholds or otherwise refrains from updating the associated CDS (not shown) with this connectivity information.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A method of managing one or more local resource properties, each having a value, by one or more managed network devices in a network comprising a network management system and a central data store, the method comprising the steps of:
    (a) monitoring the value of said one or more local resource properties;
    (b) querying the local resource properties, determining a state, value and quality of the local resource properties and assessing a priority of the local resource properties;
    (c) generating a learning event report comprising the value and a priority test of the learning event of at least one of the one or more local resource properties; and
    (d) transmitting the learning event report to the central data store, wherein the value of at least one of the one or more local resource properties is recorded at the central data store and made available to the network management system for asynchronous processing, wherein the value of at least one of the one or more local resource properties is uploaded by the one or more managed network devices, via a local resource manager, independent of retrieval of the value by the network management system, wherein a frequency of uploading the learning event report is determined based on a priority of a learning event associated with the learning event report.

2. The method of claim 1, wherein the central data store is a directory server.

3. The method of claim 2, wherein the step of transmitting the learning event report to the central data store comprises the step of exchanging one or more Lightweight Directory Access Protocol messages.

4. The method of claim 2, wherein the one or more internal resource properties comprise one or more properties selected from the group consisting of: managed network device hardware configurations including network modules installed; managed network device software installations including the types of software, software version levels, and the date when such information was last updated; and managed network device identity information including device name, serial number of the chassis or primary management processor, location information, type of device, network interface module name, network interface module slot number, network interface module part number, network interface module hardware revision level, network interface module serial number, and network interface module date of manufacture.

5. The method of claim 1, wherein the one or more local resource properties comprise one or more internal resource properties.

6. The method of claim 1, wherein the one or more local resource properties comprise one or more connectivity properties.

7. The method of claim 6, wherein the one or more connectivity properties comprise properties selected from the group consisting of: the OSI network model layer 2 and layer 3 addresses of an edge device, identification of the network interface module where the edge device is connected, speed of a port where the edge device is connected, one or more network protocols being used by the edge devices or systems, and an administrative and operational state of the link connecting to the edge device.

8. The method of claim 1, wherein the step of monitoring comprises the steps of detecting one or more learning events and periodically polling for a current value of the one or more local resource properties.

9. The method of claim 8, wherein the step of periodically polling comprises the step of polling for the value of the one or more learning event properties at a polling interval between 5 seconds and 5 minutes.

10. The method of claim 8, wherein the learning event report consists essentially of a value of at least one of the one or more local resource properties different from the value of the at least one of the one or more local resource properties of a preceding learning event report.

11. The method of claim 8, wherein the method further includes, after the step of detecting one or more learning events, assessing the priority of the learning event detected.

12. The method of claim 11, wherein the method further includes, after assessing the priority of the learning event detected, transmitting the learning event report to the central data store substantially immediately.

13. The method of claim 1, wherein the method further includes, prior to monitoring value of one or more local resource properties, the step of acquiring the most recent value of each of the one or more local resource properties from an internal memory when the one or more managed network devices are initialized.

14. A managed network device characterized by one or more local resource properties, the managed network device being operatively connected to a network comprising a network management system, one or more managed network devices, and a central data store, the device comprising a local resource processor for:
 (a) monitoring the value of one or more local resource properties;
 (b) detecting a change to the one or more local resource properties;
 (c) querying the local resource properties, determining a state, value and quality of the local resource properties and assessing a priority of the local resource properties;
 (d) generating one or more learning event reports, each learning event report comprising the value of one or more local resource properties; and
 (e) transmitting the one or more learning event reports to the central data store; wherein the value of at least one of the one or more local resource properties is recorded at the central data store and made available to the network management system for asynchronous processing, wherein the value of at least one of the one or more local resource properties is uploaded by the one or more managed network devices, via a local resource manager, independent of retrieval of the value by the network management system, wherein a frequency of uploading the one or more learning event reports is determined based on a priority of each of one or more learning events associated with the one or more learning event reports.

15. The managed network device of claim 14, wherein the central data store is a directory server enabled to exchange one or more Lightweight Directory Access Protocol messages.

16. The managed network device of claim 14, wherein the one or more local resource properties comprise internal resource properties.

17. The managed network device of claim 16, wherein the one or more internal resource properties comprise one or more properties selected from the group consisting of: managed network device hardware configurations including network modules installed; managed network device software installations including the types of software, software version levels, and the date when such information was last updated; and managed network device identity information including device name, serial number of the chassis or primary management processor, location information, type of device, network interface module name, network interface module slot number, network interface module part number, network interface module hardware revision level, network interface module serial number, and network interface module date of manufacture.

18. The managed network device of claim 14, wherein the one or more local resource properties comprise one or more connectivity properties.

19. The managed network device of claim 18, wherein the one or more connectivity properties comprise properties selected from the group consisting of: the OSI network model layer 2 and layer 3 addresses of an edge device, identification of the network interface module where the edge device is connected, speed of a port where the edge device is connected, one or more network protocols being used by the edge devices or systems, and an administrative and operational state of the link connecting to the edge device.

20. The managed network device of claim 14, wherein the managed network device is a switching device further comprising:
 (a) a plurality of network interface modules;
 (b) one or more packet processors for performing packet parsing and ingress packet processing necessary to perform switching routing; and
 (c) one or more memory devices for retaining one or more rules sets for switching and routing.

21. A asynchronous network resource management system comprising:
 (a) at least one central data store;
 (b) one or more local resource properties, each having a value;
 a plurality of managed network devices adapted to monitor the value of each of the one or more local resource properties, query the local resource properties, determine a state, the value and quality of the local resource properties and assessing a priority of the local resource properties;
 (c) and transmit the value of each of the one or more local resource properties to the at least one central data store; and
 (d) at least one network management system adapted to retrieve the value of each of the one or more local resource properties from the at least one central data store, wherein the value of at least one of the one or more local resource properties is uploaded by the one or more managed network devices, via a local resource manager, independent of retrieval of the value by the network management system, wherein a frequency of uploading the one or more learning event reports is determined based on a priority of each of one or more learning events associated with the one or more learning event reports.

22. The asynchronous network resource management system of claim 21, wherein the one or more local resource properties comprise internal resource properties.

23. The asynchronous network resource management system of claim 21, wherein the one or more internal resource properties comprise one or more properties selected from the group consisting of: managed network device hardware configurations including network modules installed; managed network device software installations including the types of software, software version levels, and the date when such information was last updated; and managed network device identity information including device name, serial number of the chassis or primary management processor, location information, type of device, network interface module name, network interface module slot number, network interface module part number, network interface module hardware revision level, network interface module serial number, and network interface module date of manufacture.

24. The asynchronous network resource management system of claim 21, wherein the one or more local resource properties comprise one or more connectivity properties.

25. The asynchronous network resource management system of claim 24, wherein the one or more connectivity properties comprise properties selected from the group consisting of: the OSI network model layer 2 and layer 3 addresses of an edge device, identification of the network interface module where the edge device is connected, speed of a port where the edge device is connected, one or more network protocols being used by the edge devices or systems, and an administrative and operational state of the link connecting to the edge device.

* * * * *